US012224145B2

(12) United States Patent
Yamaoka et al.

(10) Patent No.: US 12,224,145 B2
(45) Date of Patent: Feb. 11, 2025

(54) PROTECTION DEVICE

(71) Applicant: Littelfuse, Japan G.K., Tokyo (JP)

(72) Inventors: Toshikazu Yamaoka, Tokyo (JP); Hajime Takahashi, Tokyo (JP); Katsuaki Suzuki, Tokyo (JP)

(73) Assignee: Littelfuse, Japan G.K., Tokyo (JP)

( * ) Notice: Subject to any disclaimer, the term of this patent is extended or adjusted under 35 U.S.C. 154(b) by 220 days.

(21) Appl. No.: 17/950,555

(22) Filed: Sep. 22, 2022

(65) Prior Publication Data

US 2023/0097068 A1 Mar. 30, 2023

(30) Foreign Application Priority Data

Sep. 24, 2021 (JP) ................................. 2021-155416

(51) Int. Cl.
*H01H 71/16* (2006.01)
*H01H 71/08* (2006.01)

(52) U.S. Cl.
CPC ............ *H01H 71/16* (2013.01); *H01H 71/08* (2013.01)

(58) Field of Classification Search
CPC ....................... H01H 71/08; H01H 71/16–164
See application file for complete search history.

(56) References Cited

U.S. PATENT DOCUMENTS

| | | | | |
|---|---|---|---|---|
| 3,261,947 | A | 7/1966 | Johannes | |
| 6,346,796 | B1 | 2/2002 | Takeda | |
| 6,448,883 | B1 | 9/2002 | Hofsass | |
| 9,472,363 | B2 * | 10/2016 | Takeda | H01H 71/16 |
| 9,601,293 | B2 * | 3/2017 | Takeda | H01H 61/01 |
| 2011/0140827 | A1 * | 6/2011 | Suzuki | H01H 37/5418 337/362 |
| 2015/0035641 | A1 * | 2/2015 | Mochizuki | H01H 71/025 29/622 |
| 2017/0062161 | A1 | 3/2017 | Takeda | |

FOREIGN PATENT DOCUMENTS

| | | | |
|---|---|---|---|
| EP | 0836210 | A2 | 4/1998 |
| JP | H09204862 | A | 8/1997 |
| JP | 2003297204 | A | 10/2003 |
| JP | 2017224571 | A | 12/2017 |

OTHER PUBLICATIONS

European Search Report and Written Opinion for the European Application No. EP22197364, mailed Feb. 1, 2023, 9 pages.

* cited by examiner

*Primary Examiner* — Jacob R Crum
(74) *Attorney, Agent, or Firm* — KDW Firm PLLC

(57) ABSTRACT

A protection device includes a movable arm, a fixed terminal, and a bimetallic member, and a casing that accommodates them, the bimetallic member is located either above or below the movable arm, one end of the bimetallic member applies force to one end of the movable arm, thereby holding one end of the movable arm and the fixed terminal in contact.

13 Claims, 8 Drawing Sheets

PROTECTION DEVICE

Cross-Reference to Related Application

This application claims the benefit of priority to, Japanese Patent Application No. 2021-155416, filed Sep. 24, 2021, entitled, "Protection Device," which application is incorporated herein by reference in its entirety.

Field of the Disclosure

The present invention relates to a protection device, in particular, a device used for the protection of an electric circuit, the protection of an electrical device, and the like.

Background

A protection device configured to open the electrical circuit and shut off the abnormal current by taking advantage of the fact that the bimetallic member is heated and inverted deformation by the heat generated by the abnormal current flow is known (see, for example, Patent Document 1 JP-A-2003-297204). This protection device has a bimetallic member below the movable arm in a state where the contact provided in the movable arm of the terminal into which the current flows in and the contact provided in the fixed terminal of the terminal that flows out are in contact. The movable arm is configured to use metal elasticity to press the contact point to the fixed terminal contact (that is, by energizing) and maintain the state in which the contacts are in contact with each other.

When a normal current flows in the electrical circuit of the electrical device on which this protection device is placed, both contacts are in contact and the circuit is closed, and the bimetallic member is located below the movable arm. When an abnormal current flows through the electric circuit, when a movable arm, a fixed terminal, or the like is heated by the current, the bimetallic member is heated by the heat and inverted deformity. As a result, the bimetallic member pushes up the movable arm, and the contacts of the movable arm move upwards, and the contacts that were in contact are separated from each other and the electric circuit is opened.

When such a protection device is used in an electrical device, for example, the occurrence of an abnormality in the device in which an abnormal current occurs and the subsequent elimination of the abnormality causes the contacts of the protection device to be separated and subsequently contacted. When such separation and contact are repeated, the contacts may be worn due to arc generation due to the opening and closing of the contacts. This wear requires that the movable arm be pressed further downwards, but the pressing pressure on the fixed terminal may be insufficient due to the change over time of the pressing pressure of the movable arm. In addition, the contact force between the contacts can be reduced. In addition, wear powder is generated by wear, and fine irregularities may occur on the surface of the contact. When the contacts are opened and closed under such circumstances, arcing discharge is more likely to occur.

The arcing that occurs as described above may eventually weld the contacts together. When the contacts are welded together, even if an abnormal current flows, the contacts remain in contact and do not open (therefore since the electrical circuit does not become an open state while remaining in the closed state), the abnormal current cannot be cut off, the protection device becomes a failure state that does not fulfill its function, and the electrical device, the electric circuit, etc., cannot be protected.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a protection device in accordance with the present disclosure may include a fixed terminal, a movable arm, a bimetallic member, and a casing. The movable arm has a movable arm end. The bimetallic member is located on either an upper side or a lower side of the movable arm and has a bimetallic member end. The casing accommodates the fixed terminal, the movable arm, and the bimetallic member. The bimetallic member end applies a force to the movable arm end, which holds the movable arm end in contact with the fixed terminal.

DETAILED DESCRIPTION

Figure 1:
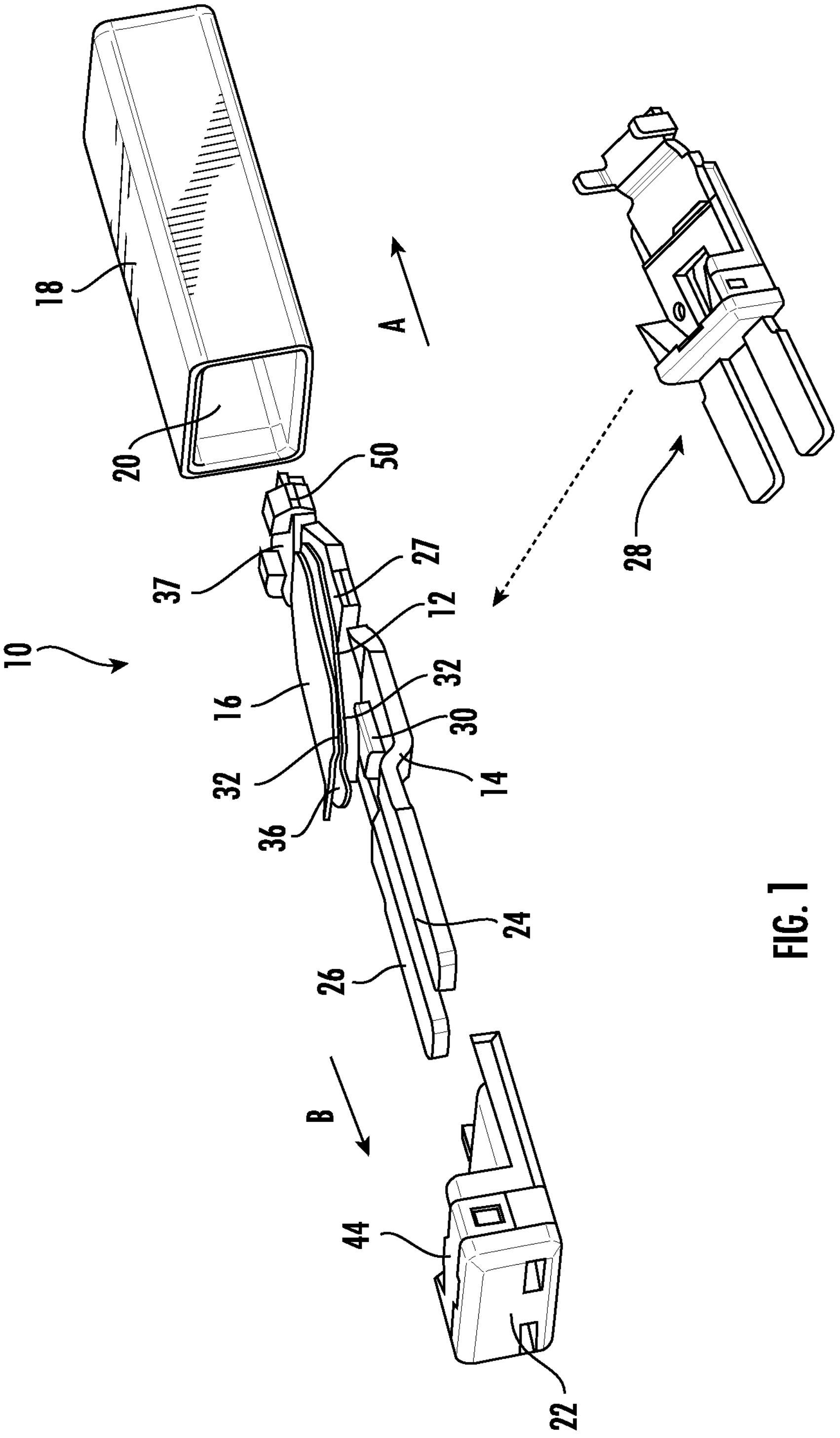
FIG. 1 is a diagram illustrating a protection device, in accordance with exemplary embodiments.

A new method of opening and closing the contact point in a protection device is disclosed. The protection device may be incorporated into the electrical circuit of an electrical device. When an abnormal current flows through the electrical circuit due to a failure of the electrical device or the like, the current flow is cut off and all downstream electrical loads are protected. In another aspect, the protection device serves as a so-called circuit protector that protects the electrical load by shutting off abnormal currents to individual electrical loads.

In an exemplary embodiment, the protection device comprising a fixed terminal, a movable arm and bimetallic member located above it, with a casing to house them. The bimetallic member is located on either the upper or lower side of the movable arm. One end of the bimetallic member applies force to one end of the movable arm, thereby holding the end and the fixed terminal in contact with one side of the movable arm.

In exemplary embodiments, the movable arm and the bimetallic member of the protection device are both located above the fixed terminal, and in a state where no force is applied by one end of the bimetallic member. One end of the movable arm is in the original state separated from the fixed terminal. By applying force to one end of the bimetallic member, the bimetallic member is held in a state where the end of the movable arm and the fixed terminal are in contact with each other in a state of resisting the elastic force of the movable arm. Thus, when the force exerted by one end of the bimetallic member to one end of the movable arm decreases, and preferably substantially disappears, and the elastic force of the movable arm is greater than that force, one end of the movable arm is allowed to move upwards, so that a void is formed between them by separating from the fixed terminal. The decrease in force applied by one end of the bimetallic member described above is caused by the reversal of the bimetallic member.

The force that one end of the bimetallic member applies to one end of the movable arm is, in one embodiment, that one end of the bimetallic member can be applied as a pressing pressure by pressing (or pushing) one end of the movable arm toward the fixed terminal. In another aspect, one end of the bimetallic member can be applied as a pulling force by pulling (or pulling) one end of the movable arm toward the fixed terminal.

In a first preferred embodiment, the bimetallic member of the protection device is located above the movable arm, and one end of the bimetallic member is a force, that is, a pressing pressure is applied to one end of the movable arm, thereby pressing one end of the movable arm toward the fixed terminal to hold them in contact (providing electrical continuity between the movable arm and the fixed terminal).

In an exemplary embodiment, a protection device (10) consisting of a movable arm (12), a fixed terminal (14) and a bimetallic member (16) and a casing (18) to accommodate them. The fixed terminal (14) is provided below the movable arm (12), and the bimetallic member (16) is provided above the movable arm (12). The bimetallic member, when inverted, allows one end of the movable arm to move upwards, thereby allowing one end of the movable arm to be separated from the fixed end to form a void between the one end of the movable arm and the fixed terminal (electrical conduction between these can be blocked).

In another exemplary embodiment, the bimetallic member of the protection device is located below the movable arm, and one end of the bimetallic member is a force. That is, a pulling force is applied to one end of the movable arm, thereby pressing one end of the movable arm toward the fixed terminal and holding them in contact. As a result, there exists electrical continuity between the movable arm and the fixed terminal.

In this embodiment, the protection device (10) has a movable arm (12), a fixed terminal (14) and a bimetallic member (16). A casing (18) to accommodate these features has a fixed terminal (14) below the movable arm (12), and a bimetallic member (16) is provided between the fixed terminal and the movable arm (12). When the bimetallic member is inverted, one end of the movable arm is allowed to move upwards, thereby one end of the movable arm is separated from the fixed terminal, and a void is formed between the one end of the movable arm and the fixed terminal (so that electrical conduction between them can be blocked).

In any embodiment, the rigidity of the bimetallic member is utilized so that one end of the bimetallic member can forcibly approach the fixed terminal by applying force to one end of the movable arm and maintain a state in which they are in contact. Further, when the bimetallic member reaches a threshold temperature and is reversed, one end of the bimetallic member is displaced in the direction away from the fixed terminal, reducing the force applied to one terminal of the movable arm, preferably to zero, to allow one end of the movable arm to move away from the fixed terminal.

In the exemplary protection devices, the movable arm and bimetallic members have one end of each of the above-described ends being free ends and the other end being a fixed end (or fulcrum), which may alternatively be described as a cantilever structure. The other end is held in the casing, for example, as a whole. Movable arms and fixed terminals may be constructed of the same or different types of electrically conductive materials, such as copper, phosphorus, bronze, beryllium, copper, white brass, stainless steel, etc., due to the need to form part of the electrical circuit in which the protection device is placed. In another aspect, the movable arms and fixed terminals may be composed of various cladding materials of such materials.

In the exemplary protection device, a state that provides electrical conduction between the movable arm and the fixed terminal as described above is also referred to as a "close state" (including operation of closing the circuit). As described above, the state of shutting off electrical continuity between the movable arm and the fixed terminal is defined as the "open state" (including the operation of opening the circuit).

The exemplary protection device is manufactured and supplied as a product in a closed state and can be incorporated into a predetermined electrical circuit or electrical device in that state.

Usually, if normal current is flowing in an electrical device having an electrical circuit in which the protection device is located, the protection device is in a closed state. When an abnormal current flows, when the bimetallic member is heated above a predetermined threshold temperature by the heat generated by the abnormal current, it is reversed and the protection device changes to an open state, and the current flow can be interrupted. When the temperature of the bimetallic member that has ceased to be heated due to the interruption of the current becomes lower than the threshold temperature, the bimetallic member returns to its original shape (that is, it recovers) and the protection device returns to the closed state, and the abnormal current flows again through the electrical circuit.

In a preferred embodiment, the movable arm has a contact at one end of which contacts contact the fixed terminal. This contact may be a protrusion formed of an electrically conductive material.

In a preferred embodiment, the fixing terminal has a contact, at which the end of the movable arm preferably contacts the contacts provided therein. In a particularly preferred embodiment, in the closed state of the protection device, the contacts provided on the movable arm are in contact with the contacts of the fixed terminals.

In the exemplary protection device, in a state where a normal current is flowing, the movable arm is in a closed state in contact with the fixed terminal due to the pressing pressure or pulling force of the bimetal. When the bimetallic member is reversed during an abnormal current, the end of the bimetallic member applying force to the movable arm moves upwards, and the pressing pressure is reduced, and is preferably substantially absent, so that the movable arm is based on its elasticity to return to its original shape. One end of the movable arm move upwards though.

When the protection device is in the closed state, one end of the bimetallic member applies a pressing or pulling force to one end of the movable arm, thereby elastically deforming against the elasticity of the movable arm, and one end of the movable arm is pressed downward toward the fixed terminal and held. Specifically, one end of the movable arm has a force that is a downward force greater than the upward force (upward elastic force) that tries to move upward due to its elasticity, one end of the bimetallic member. By applying it to one end of the movable arm, the movable arm is brought into contact with the fixed terminal to maintain the state. This state corresponds to a closed state in which the electrical device on which the protection device is located operates normally and normal current flows through the electrical circuit.

The bimetallic member is a well-known member and is formed from a bimetallic material in which metals having different coefficients of thermal expansion are bonded. Bimetallic materials are used, for example, relays, switches, and the like. As is well known, when the bimetallic member is heated and exceeds a predetermined threshold temperature, it rapidly deforms. Such variations are also commonly referred to as "inversion" and the term "inversion" is also used herein.

In this way, the bimetallic member inverted and changes its shape is also known as a snap action. In the protection device, as long as the force decreases from the closed state in which the force is acting using the inversion of the bimetallic member as described above, preferably becomes zero and changes to the open state, the bimetallic member may be in any suitable form.

In the exemplary protection device, the bimetallic member is abruptly deformed, for example, from a flat plate shape, and is inverted to a downward convex plate shape, so that the end of the bimetallic member in contact with the fixed terminal moves upward and becomes an open state. In another aspect, the bimetallic member is inverted from a downward concave plate shape to a flat plate shape or a downward convex plate shape, and even in this case, the end of the bimetallic member in contact with the fixed terminal moves upward and becomes an open state.

Note that when the bimetallic member is reversed, one end of the bimetallic member moves upwards, but this movement may be stopped by complete reversal of the bimetallic member (that is, reversal when there is nothing that inhibits the reversal). In another aspect, one end of the bimetallic member that moves upward by reversal is a member located above it, for example, the wall surface of the casing (e.g., the inner surface of the portion constituting the ceiling portion of the casing). By being in contact with it, further upward movement may not be possible and may stop. In yet another aspect, a bonding member (for example, a plate disposed inside the ceiling portion of the casing) is provided as a stopper inside the casing, and one end of the bimetallic member may be stopped in contact. In yet another aspect, instead of one end of the bimetallic member, the upward movement of the movable arm at one end may be stopped. In either case, it is necessary to ensure that one end of the movable arm or the contact provided therein is separated from the fixed terminal or the contact provided thereon.

As described above, when one end of the bimetallic member moves upwards, the movable arm is elastically returned to its original shape (i.e., the shape of the movable arm when there is no force acting from the outside). The one end of the movable arm moves upwards, that is, one end of the movable arm moves away from the fixed terminal. As a result, voids are formed between these, and electrical conduction between them is cut off, resulting in an open state.

In the exemplary protection device, a closed state in which one end of the movable arm is pressed downward by one end of the bimetallic member occurs as described above to provide electrical conduction.

It is provided as a product in, and this protection device is placed and operated on, for example, an electrical device. When the operation of the electrical device is normal, that is, when a normal current is flowing in the electrical circuit, electrical conduction is provided between the fixed terminal and the movable arm of the protection device, so that the normal current passes therethrough.

For example, when an excessive abnormal current flows due to trouble with an electrical device, the bimetallic member is reversed by the heat generated. As a result, as described above, one end of the movable arm is separated from the fixed terminal and becomes an open state, and electrical conduction is cut off, and the electrical device, the electrical circuit, and the like are protected from abnormal current.

Effect of the invention

In the exemplary protection device, the shape of the movable arm is originally formed so that the end of the movable arm is separated upward from the fixed terminal and is fixed integrally with the bimetallic member at the other end in the casing and is forcibly elastically deformed by a force acting by one end of the bimetallic member. It is configured to contact the fixed terminal. If a bimetallic member is removed from this composition, one end of the movable arm that is the free end (since the force does not act) moves elastically toward the original shape (that is, upwards) and returns to a state separated from the fixed terminal as predetermined.

By appropriately selecting the material, shape, dimensions, and the like of the movable arm, a movable arm can be formed so that one end of the movable arm is originally separated from the fixed terminal as predetermined. A bimetallic member is constructed so as to apply downward pressing pressure or pulling force downward to such a movable arm, forcibly and elastically moving one end of the movable arm downward to contact the fixed terminal to maintain a contact state.

When the bimetallic member is heated above the threshold temperature by the heat generated by the flow of an abnormal current flowing through the movable arm or the like, it is reversed as described above, so that one end of the bimetallic member moves upward and (momentarily) reduces or releases the force acting on one end of the movable arm, and it cannot hold the state that it is in contact with the fixed terminal. One end of the movable arm moves upward and separates from the fixed terminal.

In a conventional protection device in which a bimetallic member is arranged below the movable arm, the moving arm that originally presses the fixed terminal downward by itself. It is necessary to forcibly separate the moving arm from the fixed terminal by pushing it up by inversion. In order to push up in such a way, it is necessary to design the bimetallic member to apply an upward force greater than the downward pressing pressure of the movable arm acting on the fixed terminal to the movable arm by inversion.

On the other hand, in the exemplary protection device, in order to separate the movable arm from the fixed terminal, the bimetallic member only needs to be inverted. That is, in the protection device of the present invention, if the vital member is inverted at a threshold temperature, the movable arm will naturally return to its original shape (i.e., by the nature of the shear itself) elastically. It will try to return to its original shape, and one end of the bimetal will automatically be separated upward from the fixed terminal. Thus, in the protection device of the present invention, the bimetallic member only needs to be reversed, and it is considered that there is no need to precisely consider the upward force of the bimetallic caused by the reversal, that is, the upward force of the bimetal, and thus the design can be simplified with respect to the inversion of the bimetallic member in the protection device. At the very least, a protection device based on a completely different philosophy from conventional protection devices is provided in that it takes advantage of the nature of the movable arm to return to its original form.

Form for Implementing the Invention

Hereinafter, with reference to the accompanying drawings, the protection device of the present invention will be described in more detail. Although the protection device of the first preferred embodiment described above will be mainly described by way of example, except for the description related to the bimetallic member pulling down the movable arm, such description also applies to the protection device of the second preferred embodiment described above. The feature that applies only to the protection device of the second preferred embodiment will be described with reference to the figures.

FIG. 1 is a representative drawing of the protection device 10, according to exemplary embodiments. In the schematic perspective view of FIG. 1, a partially disassembled view of the protection device (in a closed state) is shown. The protection device 10 includes a plate-like movable arm 12 made of conductive metal, a plate-like fixing terminal 14 made of conductive metal, and a plate-like bimetallic member 16. In this protection device, a bimetallic member 16 and a movable arm 12 are located above the fixed terminal 14, and the bimetallic member 16 is located above the movable arm 12. In the illustrated aspect, the protection device 10 further includes an end molding unit 22 that fits into the casing 18 illustrated and its front end opening 20. The arrow marks shown in FIG. 1 schematically indicate the "front", "back", "right", "left", "up" and "down" directions used in the description herein.

Figure 2:
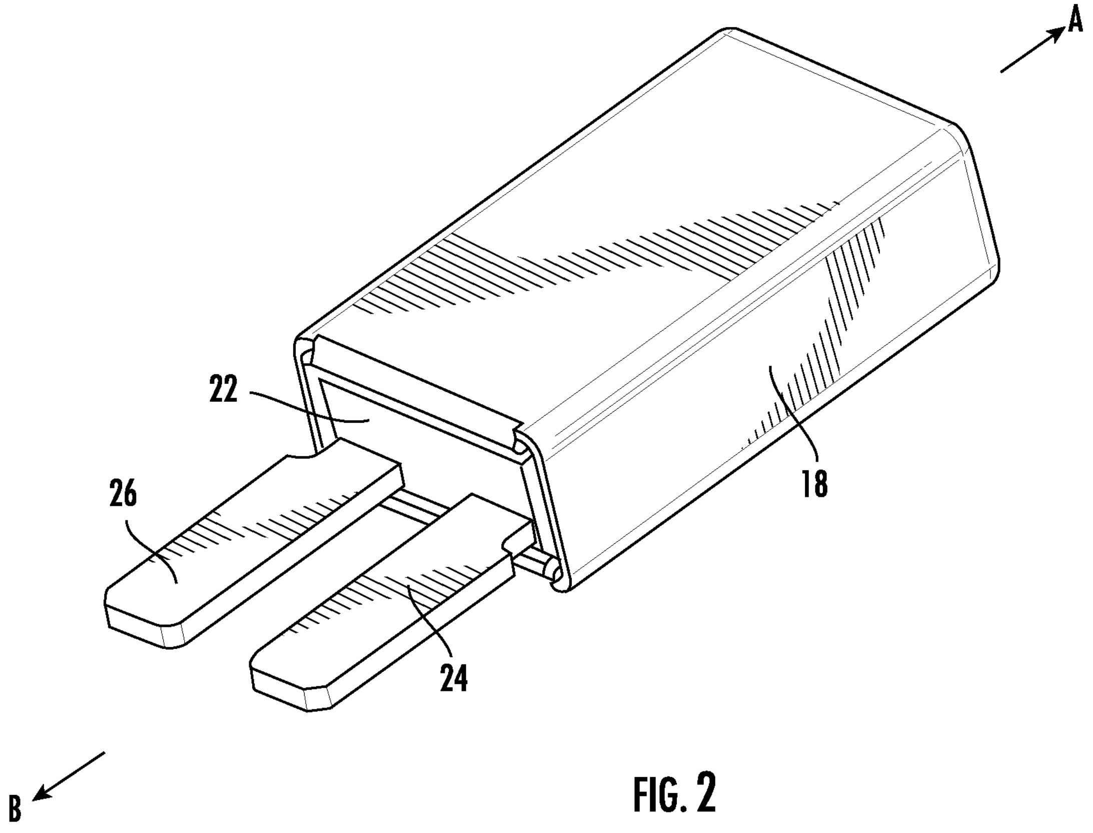
FIG. 2 is a diagram illustrating the protection device of FIG. 1, in accordance with exemplary embodiments.
Figure 3:
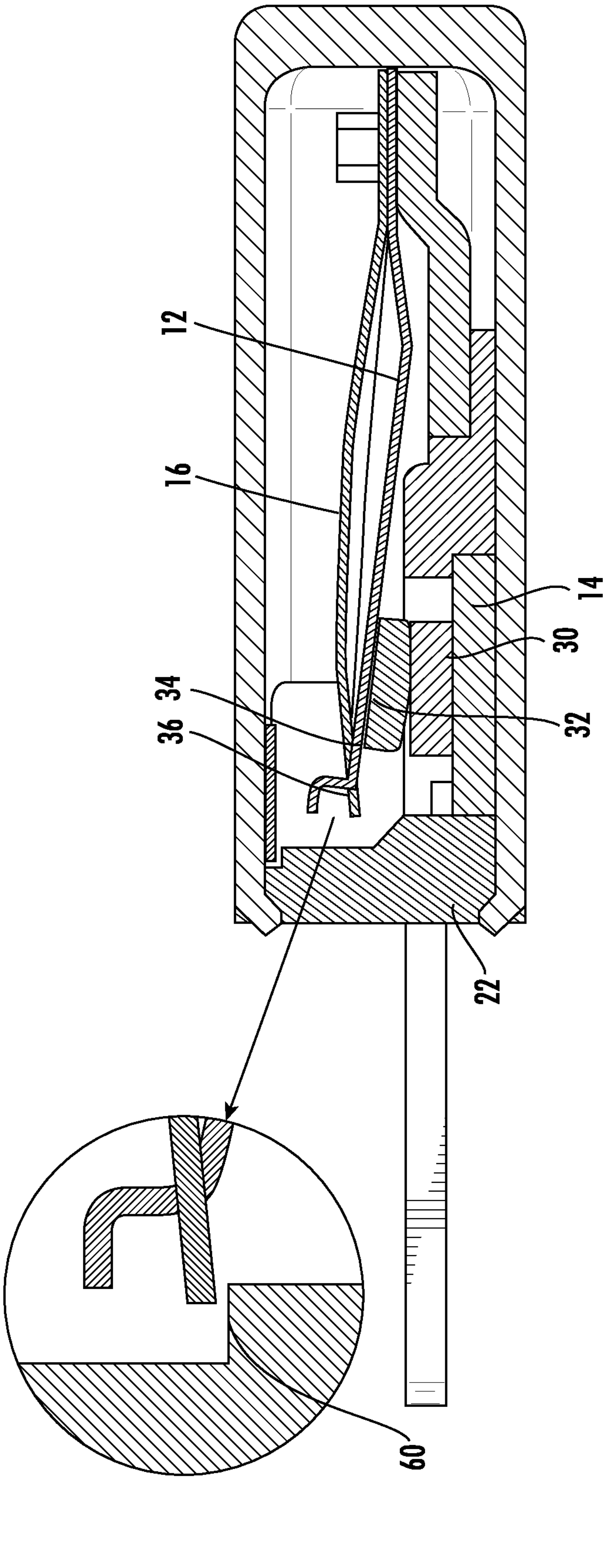
FIG. 3 is a diagram illustrating the protection device of FIG. 1, in accordance with exemplary embodiments.

FIG. 2 is a representative drawing of the protection device 10 of FIG. 1, according to exemplary embodiments. FIG. 2 is a perspective view schematically showing the original state of the protection device before disassembly as shown in FIG. 1. The longitudinal cross section of the protection device of FIG. 2 is schematically shown in FIG. 3. FIG. 3 shows a schematic cross-sectional view of the protection device shown in FIG. 2 (in the closed state) in its longitudinal direction.

For ease of understanding, in FIG. 1, the casing 18 and the end molding unit 22 are shown in a state of moving along the longitudinal direction from the original state of the protection device 10 shown in FIG. 2. For details, the casing 18 is defined in the direction of the arrow A (that is, the back direction). The end molding unit 22 is shown in a state in which it has been moved to the direction of arrow B (that is, the forward direction).

The bimetallic member 16 is located above the movable arm 12, and the front end 36 of the bimetallic member 16 applies downward pressing pressure to the front-end portion 34 of the movable arm 12 and presses the movable arm 12 toward the fixed terminal 14. The movable arm 12 is designed so that in its original state where such pressing pressure does not act, the end 34 is separated from the fixed terminal 14 but is forcibly elastically deformed by the pressing pressure and brings about an attaching state as shown.

The exemplary protection device 10 includes a first connection terminal 24 and a second connection terminal 26. The first connection terminal 24 is electrically connected to the fixed terminal 14, in a preferred embodiment, the first connection terminal 24 and the fixed terminal 14 may constitute a single member as shown, each of which is a portion of a single member. The second connection terminal 26 has an extending member 27 thereafter and may also constitute a single member as shown. Thus, with respect to a single member, details can be viewed in FIG. 5 below. In the illustrated embodiment, the extension member 27 is electrically connected in a state of overlapping the rear end 13 of the movable arm 12. For example, the rear end 13 (corresponding to the "other end") and the extension member 27 of the movable arm 12 are in contact and are in contact and are integrally fastened by the caulking fastening 50 in a laminated state. As shown, the bimetallic member 16 is also integrally fastened to the movable arm 12 at the rear end 37 and the rear end 13 in detail.

FIG. 1 also illustrates a preassembly 28 in which the first connection terminal 24 integrated with the fixed terminal 14 and the second connection terminal integrated with the extension member 27 are combined in a state where they pass through an opening located on the front surface of the end molding unit 22. The movable arm 12 and the bimetallic member 16 are superimposed on the preassembly 28 to form an assembly obtained by caulking 50 and combining them integrally and inserting this from the opening 20 of the casing 18 to form a protection device of the present invention shown in FIG. 2.

In the illustrated embodiment, the fixed terminal 14 has a contact 30 on the upper side, and the movable arm 1 2 has a contact 32 on the underside of the front end 34. In the closed state, such a protection device, as shown in FIG. 3, the contact 30 and the contact 32 contact with each other and provide electrical continuity. In the open state, as shown in FIG. 4 described later, the contact 32 is separated from the contact point 30 and electrical conduction is blocked.

Figure 4:
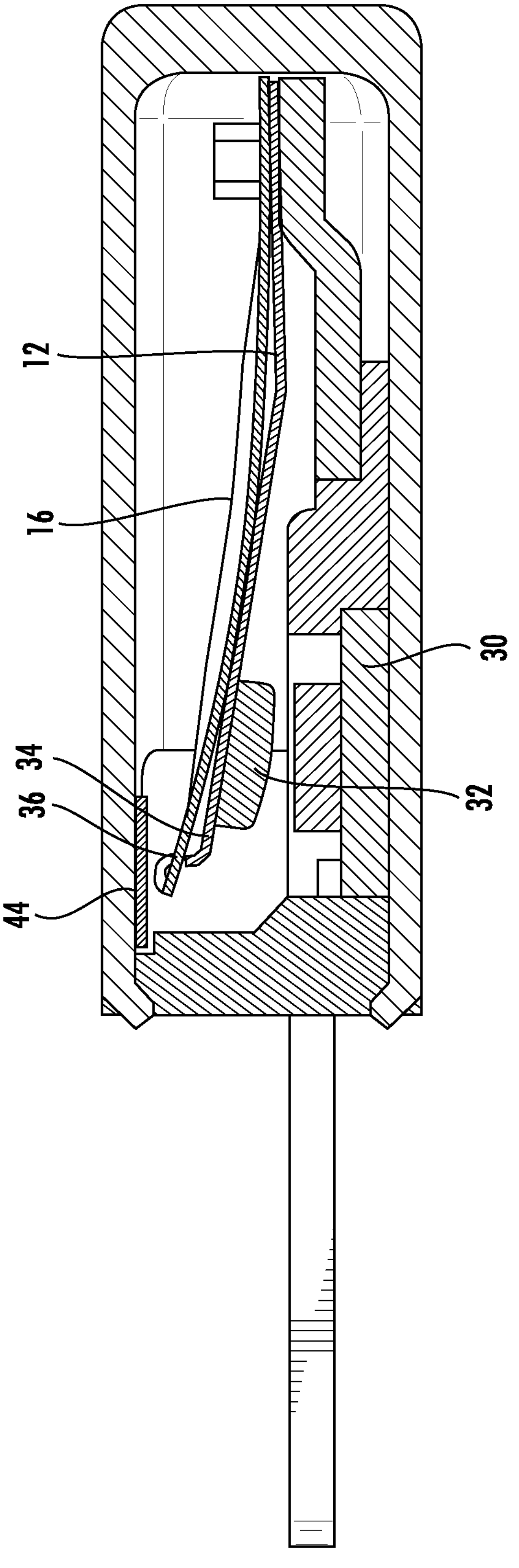
FIG. 4 is a diagram illustrating the protection device of FIG. 1, in accordance with exemplary embodiments.

The movable arm 12 is the original shape of the movable arm 12 if there is no bimetallic member 16 above it (that is, the original shape of the movable arm 12 when the pressing pressure by the bimetallic member 16 does not act (it is also called "original shape"), the end portion 34 of the movable arm 12 is formed so as to be located above the position shown in FIG. 4, which shows a schematic cross-sectional view in which the protection device 10 is in an open state. For example, when the protection device is in a closed state as shown in FIG. 3, the end 36 of the bimetallic member 16 is in contact with the end 34 of the movable arm 12 and the movable arm 12 is pressed down, and the movable arm 12 is elastically deformed to push down the end 34 so that the contact 32 contacts the contact 30.

In this way, for the bimetallic member 16 to elastically deform the movable arm 12, the bimetallic member 16 has the original shape before the reversal, as shown in FIG. 3, The front-end portion 34 of the movable arm 12 is moved downward to the fixed terminal 14. For example, it has a rigidity that can maintain a state in contact with the contact 32 provided thereon.

More particularly, by connecting the movable arm 12 and the bimetallic member 16 at their respective rear ends, for example by a caulking 50, the bimetallic member 16 holds a state in which the end portion 34 of the movable arm 12 is pressed downward by the pressing pressure Fl. In this situation, even if the reaction force F2 (corresponding to the elastic force of the movable arm 12 with respect to the pressing pressure of the bimetallic member) that the end portion 34 tries to push the end portion 36 of the bimetallic member 16 upward is acted, the bimetallic member 16 has a rigidity to the extent that it does not substantially deform, and the pressing state of the movable arm 12 can be maintained.

To maintain the pressing state in this way, for example, the bimetallic member can be prevented from being deformed by appropriately selecting the shape and dimensions (especially length, width, and thickness) of the bimetallic member, the constituent material, and the like. In the closed state, the pressing pressure F1 is substantially larger than the elastic force F2, and the bimetallic member 16 is elastically deformed without substantially deforming. Let it be in the closed state as shown in FIG. 3.

As described above, the bimetallic member 16 to which pressing pressure is applied in the closed state is inverted when its temperature exceeds a predetermined threshold (for example, 170° C.). Thus, the state immediately after the bimetallic member 16 is inverted is shown in FIG. 4 with a schematic cross-sectional view similar to that of FIG. 3. Comparing FIGS. 3 and 4, it can be seen that the substantially flat plate-like or upwardly convex (slightly) convex shape 16 shown in FIG. 3 is inverted and downward (somewhat) convex as shown in FIG. 4.

As a result of such an inversion, the position of the end portion 36 of the bimetallic member 16 in FIG. 3 moves rapidly upward as shown in FIG. 4. As a result, the movable arm 12 pressed by the bimetallic member 16 can be elastically deformed toward the original shape, and therefore, the end 34 can move upwards. As is clear from FIG. 4, the contact 32 provided at the end portion 34 of the movable arm 12 is separated from the fixed terminal contact 30. Thus, this state corresponds to an open state in which electrical conduction between the movable arm 12 and the fixed terminal 14 is cut off.

Figure 5:
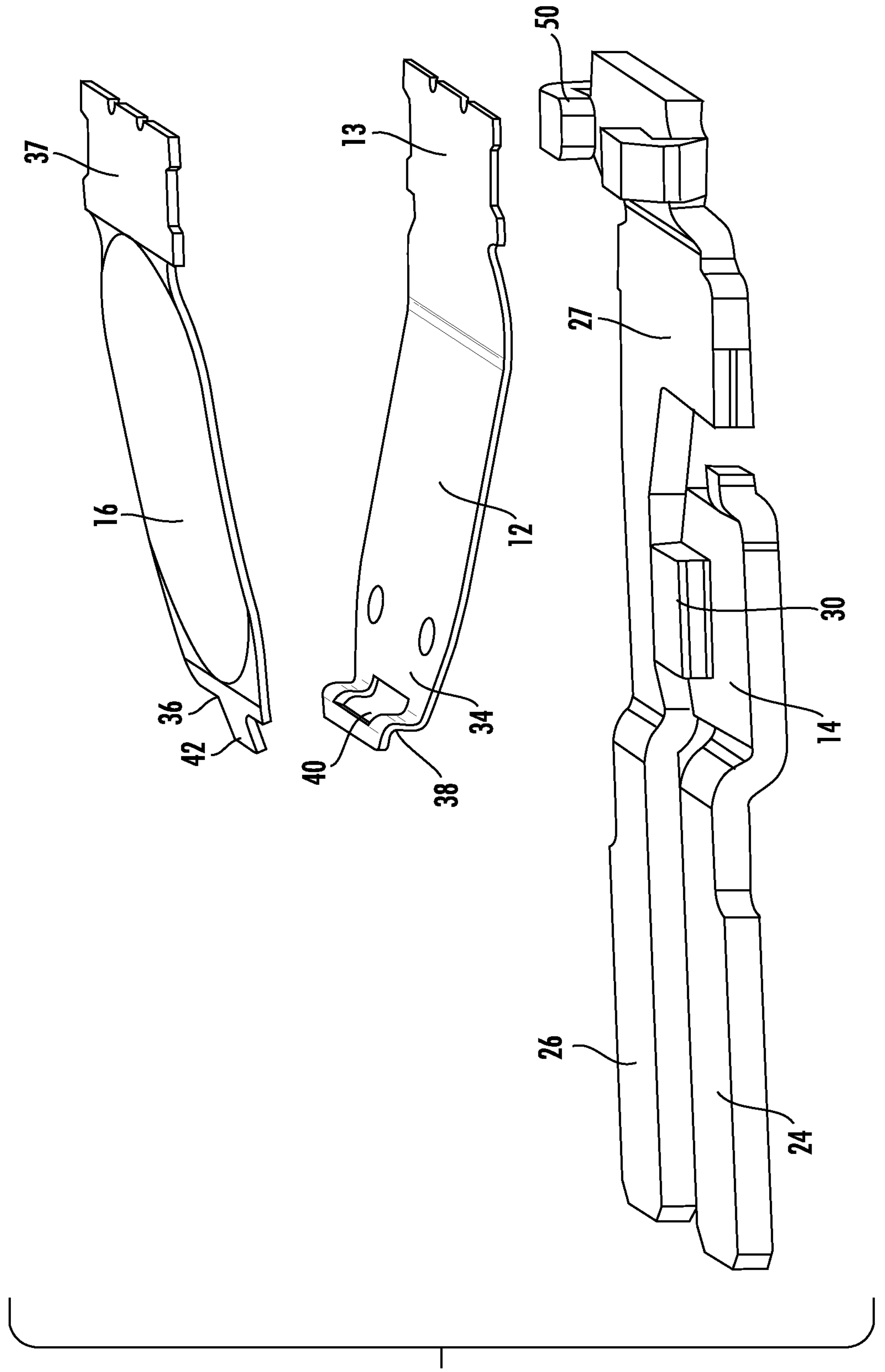
FIG. 5 is a diagram illustrating the movable arm, bimetallic member, fixed terminal, first connection terminal, and second connection terminal of the protection device of FIG. 1, in accordance with exemplary embodiments.

FIG. 5 shows in a perspective view in which only the movable arm 12, bimetallic member 16, the fixed terminal 14 and the first connection terminal 24 integrated therewith, and the second connection terminal 26 and the extension member 27 integrated therewith are taken out and separated in the vertical direction. FIG. 5 also illustrates a caulking tab 50 provided at the rear end of the extension member 27 in which the rear end 37 of the bimetallic member 16 and the rear end 13 of the movable arm are stacked and sandwiched (see FIG. 1).

As can be understood from FIG. 5, the exemplary protection device shown in FIGS. 1-5, in a preferred embodiment, the front end 38 of the movable arm 12 may have a portion that bends upward (for example, the tip portion of an L-shaped cross section as shown in the figure). The front-end portion 38 has a through opening 40, and the front end 42 of the bimetallic member 16 enters the through opening 40. By configuring the movable arm 12 and the bimetallic member 16 in this way, when the bimetallic member 16 is inverted and the end 36 moves upward as described above, the front-end portion 42 of the bimetallic member 16 fitted into the through opening 40 can raise the end portion 34 of the movable arm 12.

Upward movement of the movable arm 12 to the end 36 when the bimetallic member 16 is inverted is essentially possible by trying to elastically return the movable arm 12 toward its original shape (i.e., recovery deformation). However, even if the elastic return is insufficient for some reason (e.g., creep phenomenon), the raising of the end 34 of the movable arm 12 by the bimetallic member 16 can promote the elastic return of the movable arm 12. As a result, sufficient movement upward of the end 34 of the movable arm 12 can be achieved, and the blocking of electrical conduction can be further ensured.

In such an aspect of the protection device, when the bimetallic member 16 is inverted, the upward movement of the vital member and the movable arm (more on these ends 34) is as can be understood from FIG. 4. The front-end portion 38 of the movable arm 12 is stopped by the strip-shaped stopper 44 provided in the end molding portion 22 that fits into the front end opening 20 of the casing 18.

In the exemplary protection device, it is not always necessary to provide a through opening 40 at the front end 38 of the movable arm. In one embodiment, the front end 38 of the movable arm 12 is located below the front end 42 of the bimetallic member. In this case, the upward movement of the movable arm to the end portion 34 is based on the movable arm when the pressing pressure on the movable arm is released by inversion of the bimetallic member 16, such that it returns to the original shape. In this embodiment, the end 36 of the bimetallic member 16 is in contact with the stopper 44, the upward movement is stopped, and the end 34 of the movable arm 12 is in contact with the end 36.

The protection device shown below is provided with a stopper 44, but in one aspect, the stopper is omitted and the tip of the movable arm or the tip of the bimetallic member is in contact with the front-end portion of the wall that defines the upper surface of the casing. This reduces the number of parts that make up the protection device.

The exemplary protection device, for example, the fixed terminal 14 and the first connection terminal 24 integrated therewith as shown in FIG. 1, and the second connection terminal 26 and the rolling stock integrated therewith the preassembly 28 in which the extension member 27 is fixed by the end molding unit 22. Formed and thereafter, an assembly in which the movable arm 12 and the bimetallic member 16 are integrally fastened at the rear end of the extension member 27 by, for example, caulking, pinching means, or the like, and the first connection terminal and the second connection terminal protrude from the opening 20. It can be manufactured by inserting and fixing it into the casing 18. When assembling the assembly in this way, in the case of the protection device of FIG. 1, it is preferable to fasten the front-end portion 42 of the bimetallic member 16 in advance into the through opening 40 of the movable arm 12.

In addition, when inserting the assembly into the casing 18 having the casing 18 and the end molding portion 22 made of resin and the rear end is closed, for example, a protruding portion (not shown) provided at the bottom of the casing 18 made of resin. A recess (not shown) is provided in the fixed terminal 14 and the rolling stock member 27 (not shown). It may be fitted with a snap fit or press fit and fixed. Similarly, the end molding portion 22 can be fitted into the opening 20 by snap-fit or press fit.

Except for the matters specifically described in connection with the present invention herein, members constituting the exemplary protection devices (e.g., movable arms, bimetallic members, fixed terminals, etc.), in particular their shapes, materials, etc., can all be adopted similar to those of members conventionally used in protection devices. The same applies to the manufacture of protection devices.

In one aspect of the exemplary protection device, the bimetallic member further comprises a weakened portion. When the protection device is used in an electrical device, the closed protection device is in the open state due to abnormal current, after which the bimetal cools down and becomes closed again. Thereafter, the bimetal cools down and becomes a closed state, and so on. That is, while the abnormal current of the electrical device is not resolved, the "closed state→open state→closed state→open state→" in the embedded protection device occurs. There are cases where a state change called from "open state→closed state" occurs.

Ideally, the protection device can repeat such a state change permanently. However, in electrical devices using conventional protection devices, for example, if the period of use of the protection device is prolonged, the pressing pressure that it originally applies to the fixed terminal by the creep phenomenon of the movable arm is reduced, and the contact resistance between these may increase.

Furthermore, the contact is worn by the arc generated by repeated state changes (thus reducing the thickness of the contacts), so that the movable arm needs to be pushed further downwards. In this case, the margin of pressing pressure that secures the state in which the movable arm (specifically its contact) contacts the fixed terminal (specifically the contact) exceeds the minimum pressing pressure necessary to ensure the contact state. There is a possibility that the contact resistance will increase because the amount of contact is reduced.

As a result of such a possibility, contact welding may eventually occur due to arc generation (that is, in a closed state) and the protection device itself may be in a failure state. Thus, when the conventional protection device fails in the closed state, even if an abnormal current occurs, the weld contacts are in a conductive state and the current cannot be cut off, and the protection device has a problem that it cannot fulfill its function.

Considering such problems, if the number of state changes (conveniently, the state change in one cycle of "closed state→open state→closed state" is set to 1 time) exceeds the predetermined number of times, the protection device is intentionally open and maintains that state so that the occurrence of conduction state between contacts can be prevented (i.e., the contact maintains a distance state between contacts), therefore, it may be preferable to configure the protection device to fail in the open state.

When using such a protection device, in one embodiment, the number of state changes is a predetermined number of times is close to that (e.g., ±20% of a predetermined number of times, preferably ±5% of a predetermined number of times). When reached, the force exerted by the bimetallic member pressing the movable arm is reduced by the weakened portion, and the end of the movable arm moves upward to maintain a state separated from the fixed terminal, it can be made impossible to come into contact with the fixed terminal.

When using such a protection device, in another embodiment, the number of times the state change is a predetermined number of times or close to it (e.g., ±20% of a predetermined number of times, preferably ±5% of the predetermined number of times). When reached, the force by which the bimetallic member presses the movable arm is substantially reduced to zero by the weakened portion, and the end of the movable arm moves upward to maintain a state separated from the fixed terminal, it can be impossible to come into contact with the fixed terminal.

Depending on the actual electrical device incorporating the protection device, the upper limit of the acceptable state change is assumed in advance, and when the state change reaches the upper limit number of times, it becomes a failure state in an open state, and a bimetallic member that can maintain it the exemplary protection device has a bimetallic device. For example, in one embodiment, the number of state changes in the electrical device is counted, and when the number of counts reaches the upper limit number of times, preferably 90% of the upper limit number of times, more preferably 80% of the upper limit number of times, the protection device in use is replaced with a new protection device. In another case, if the protection device fails in the open state, in this case, the protection device in use is replaced with a new protection device as necessary.

The upper limit of the state change is assumed according to the electrical device incorporating the protection device. In one embodiment, when the protection device is used, for example, to prevent winding when locking a small or medium-sized motor, the protection device is sufficient if it can repeat, for example, about 15,000 state changes, thereafter, it may fail in the open state. In this case, the predetermined upper limit of the state change becomes 15,000 times, and the bimetallic member, after about 15,000th reversal/reversal recovery, the bimetallic member is unable to sufficiently press the movable arm due to the weakened portion, and the end of the movable arm breaks down in an open state separated from the fixed terminal.

The protection device predicts in advance the number of state changes in which the contact may weld as described above (this is also called "predictive welding frequency). In one aspect of the exemplary protection device, it is assumed that the upper limit is sufficiently less than the "predictive weld count". When such an upper limit state change occurs, it is preferable to configure the bimetallic so that the bimetallic member can intentionally lose the function of pressing the movable arm by the weakened portion.

In addition, "predictive welding frequency" incorporates a protection device having no weakening portion into the assumed electrical circuit. Therefore, it can be obtained by repeating that the abnormal current is intentionally passed through, and the state is changed until the terminal is welded. As will be described later, the protection device of the present invention provided with a bimetallic member having a weakened portion is incorporated into a hypothetical electrical circuit, and the number of times the abnormal current is intentionally passed through the abnormal current to change the state to measure the number of times it fails in the open state, and the number of times is the upper limit of the number of times. This upper limit can be set to a predetermined value by trial and error by various changes in the characteristics of the weakened portion (for example, the constituent material, the shape, the specific form of the weakened portion, and the like).

After a predetermined upper limit of state changes, the weakened portion that prevents the end of the bimetallic member from being able to sufficiently press the end of the movable arm is such that the pressure that the bimetallic member applies to the movable arm is, so that the upward elastic force caused by the movable arm trying to return to its original shape is smaller. Specifically, by repeating that the bimetallic member inverts from the state of pressing the movable arm and returns to the original shape (that is, it recovers), that is, the stress generated in the bimetallic member by repeating the deformation of the bimetallic member is easily concentrated in a specific region, and the region is provided in the bimetallic member as a weakened portion.

In one aspect of the protection device, as shown, the bimetallic member and the movable arm are in a state in which their respective ends are integrally fastened, for example, by a caulking member, and the bimetallic member is in the form of a so-called cantilever beam.

Therefore, originally, stress tends to be concentrated in the vicinity of the rear end of the bimetallic member which is the fastening point (that is, the place that tends to become a fulcrum at the time of deformation). In one embodiment, specifically, stress tends to be concentrated at a portion slightly forward of the fastening. Therefore, a weakened portion may be provided in such a place. In another aspect, the portion where stress is easily concentrated is actively provided in the bimetallic member as a weakened portion.

Figure 6:
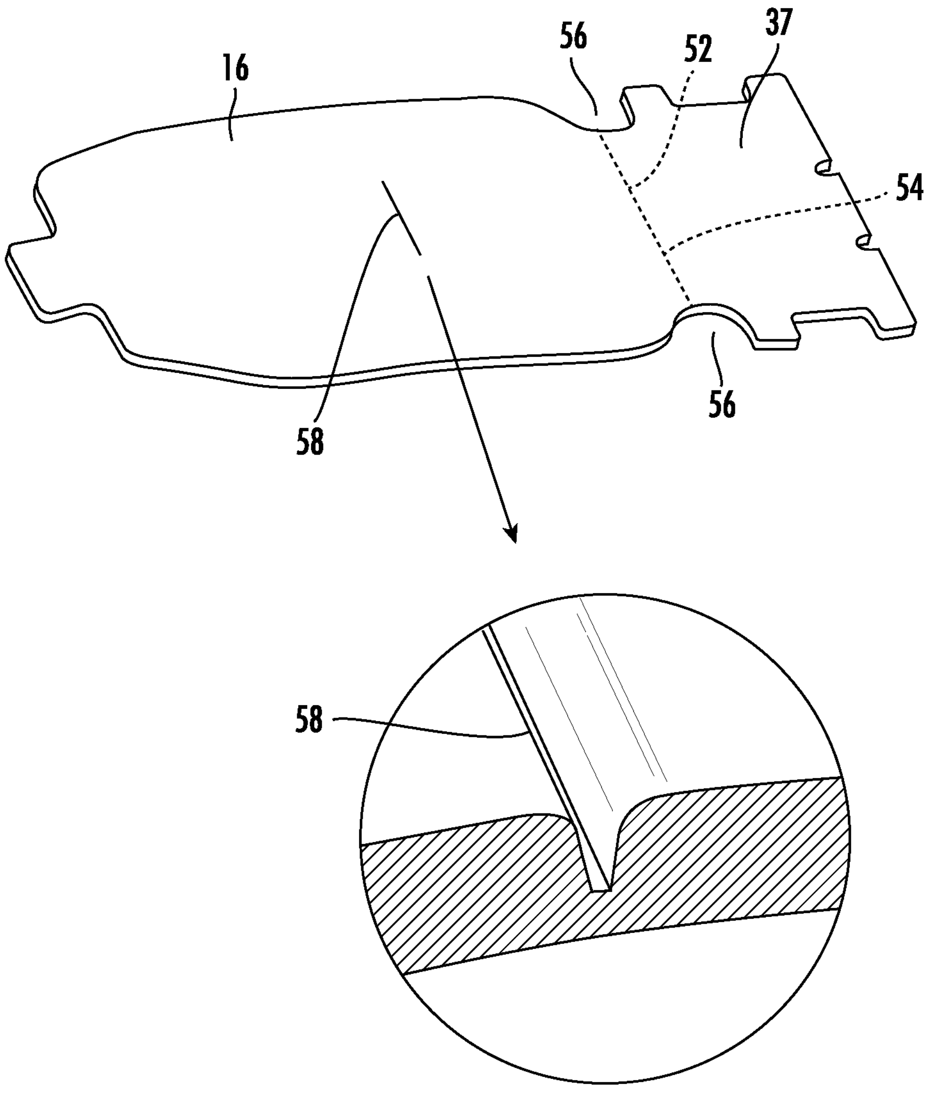
FIG. 6 is a diagram illustrating a bimetallic member of the protection device of FIG. 1, in accordance with exemplary embodiments.

FIG. 6 schematically shows one aspect of the bimetallic member 16 having a weakened portion in a perspective view. As illustrated, originally, when the state change is repeated with a slightly forward part of the rear end 37 as a fulcrum, stress tends to concentrate on the portion shown in the dashed line 52. Therefore, it is preferable to provide a weakened portion in this portion to actively promote stress concentration. When the stress concentration is promoted in this way, metal fatigue progresses, and the bimetallic member cannot apply the necessary force to press the end of the movable arm. In one case, metal fatigue causes cracks in the weakened portion, and in some cases, breaks occur in the weakened portion.

Specifically, the weakened portion extends along the dashed line 52 of the rear end 37 of the bimetallic member, for example, means 54 that promotes metal fatigue, for example, a notch having a V-shaped or U-shaped cross-section, a groove, or the like. As shown in the figure, the weakened portion shown by the dashed line 52 extends along the left and right directions perpendicular to the longitudinal direction (that is, the front and rear directions) of the bimetallic member.

In such a weakened portion, the thickness of the bimetallic member (i.e., the dimensions in the vertical direction) can be reduced locally, thereby concentrating the stress. By changing the depth, length, and width of the notch etc. (corresponding to the vertical dimensions of the plate-shaped bimetallic member, the dimensions in the left and right directions, and the dimensions perpendicular to the front and rear directions, respectively), and the cross-sectional shape of the notch along the front and rear directions. By changing the bimetallic materials that make up the bimetallic member, it is possible to control the maximum number of times that the bimetallic member loses the ability to press the movable arm.

In another aspect, the weakened portion is placed on a plate form of a bimetallic member (a field where this is viewed as a planar). It may be the formation of cutouts, corners, voids, and various combinations thereof. For example, the plate member may have a constricted portion (a portion having a narrow width of the plate), and stress can be concentrated on that portion. For example, in FIG. 6, the shape of the notch portion 56 is shown. A weakened portion can be configured by appropriately selecting dimensions and the like.

The weakened portion described above does not necessarily need to be provided in a portion where stress is easily concentrated, and in another aspect, may be provided in other parts of the bimetallic member, and a weakened portion is provided so as to actively concentrate stress on that portion. FIG. 6 illustrates a weakened portion 58 provided near the center of the bimetallic member. This weakened portion may be in the form of a notch extending in the left and right directions as described above, and a portion thereof is enlarged to schematically show a V-shaped cross section.

The weakened portion as described above may be used in various combinations as necessary. For example, notches and constrictions may be combined.

The formation of notches may be carried out by any suitable method. For example, grooves, notches, and the like can be formed on the upper surface of bimetallic members using laser processing, press processing, and the like. For example, a bimetallic member having a plate shape (plane view is substantially rectangular) (dimension (length) 10 mm in the front and rear (longitudinal direction), dimension (width) in the left and right directions 6 mm, dimension (thickness) in the vertical direction 0.13 mm) was formed by pressing the notch 58 shown in FIG. 6 as a weakened portion. The bimetallic materials that make up this bimetallic member are Ni—Cr—Fe on the high-expansion side and Ni-Fe on the low-expansion side (BL-51 manufactured by Hitachi Metals Neo Materials). The dimensions of the notch were 0.1 m in the front and rear directions, 0.05 mm in the vertical direction, and 1.8 mm in the left and right directions.

An electric current was passed through this movable arm to flip the bimetallic member and repeat the cycle of return from it (corresponding to twice the vertical movement width and amplitude of the end of the bimetallic member). After repeating 10,000 cycles, it was confirmed that cracks occurred at the notch.

Since the force by which the bimetallic member presses the movable arm is greatly reduced, the end of the movable arm or the contact provided therein is pressed against the fixed terminal or the contact provided thereon. It is considered that it is not possible to hold it in a state of contact.

In one aspect of the protection device of the present invention, a stopper that limits excessive movement downward of the advance end 36 of the bimetallic member 16 may further be provided at the front end of the housing member or the base molded portion 22. For example, as shown in FIG. 3, the base molding unit 22 may have such an overhang portion 60 as a stopper. In the illustrated embodiment, the protruding portion 60 is slightly separated from the lower surface of the front-end portion 42 of the bimetallic member. In addition, for the purpose of explaining such a protruding portion (or step portion) 60, an embodiment having a protruding portion 60 only in FIG. 3 is illustrated, and the vicinity of the protruding portion 60 is enlarged and illustrated so that it can be easily understood.

Wear of the contact point progresses by repeated opening and closing of the contact, and the thickness of the contact is reduced due to abnormal wear due to a large arc, so that the position of the front end 36 of the bimetallic member 16 and the front end 34 of the movable arm 12 at the time of closing may be lowered. As a result, a slight distance between the protruding portion 60 in the initial state and the lower surface of the bimetallic end portion 42 may be lost. In this case, the possibility that the contact point is welded due to contact wear increases, but before that, the front-end portion 42 of the bimetallic member 16 is in contact with the protruding portion 60. As a result, since the bimetallic member 16 cannot move further downwards, welding of the contacts as described above can be prevented in advance.

Such contact weakens the pressing pressure on the movable arm 12 of the bimetallic member 16. As a result, the elastic force by which the movable arm 12 tries to return to the original shape is relatively large, and the contact point can be maintained in an open state.

When a protruding portion is provided in this way, even if the protection device fails in the open state, the possibility that the movable arm 12 contacts the fixed terminal 14 for some reason is greatly reduced, and the failure in the open state can be secured. The distal end portion of the protruding portion 60 (the top end in the drawings) is such that the end of the movable arm contacts the fixed terminal (or the terminal provided therein) in a closed state. Since it is sufficient to ensure that it does not inhibit, the distal end portion of the protruding portion 60 may be located below the position shown in FIG. 3.

In the illustrated embodiment, the distal end portion of the protruding portion 60 is separated from the movable arm 12 and there is a void between them. In order to allow to some extent the wear of the contact points caused by the cycle of reversal/return of the bimetallic member 16, it is preferable to provide a protruding portion 60 so that such voids exist.

Figure 7:
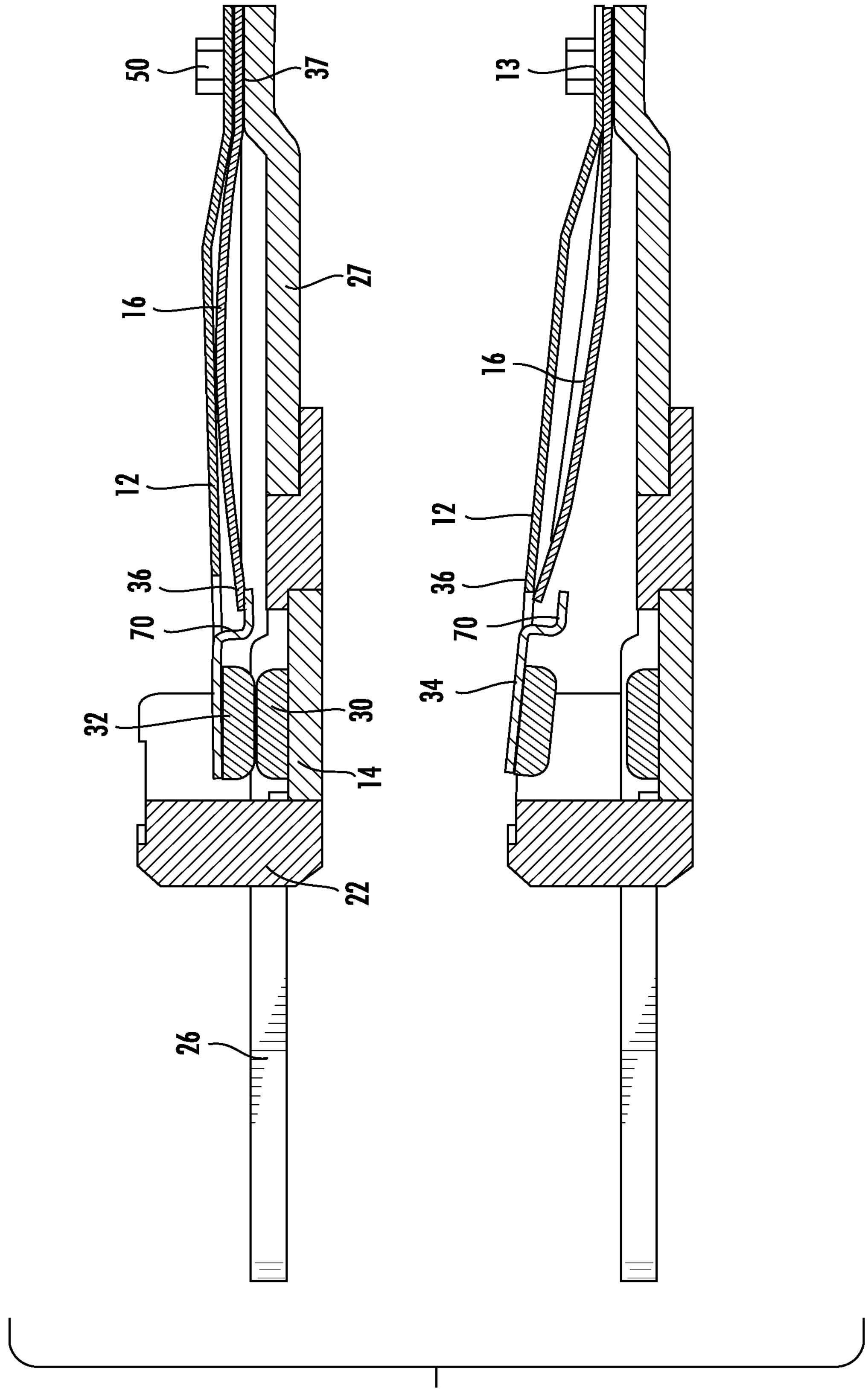
FIG. 7 is a diagram illustrating another view of the protection device of FIG. 1, in accordance with exemplary embodiments.

FIG. 7 shows a second preferred aspect of the protection device of the present invention (a mode in which a bimetallic member pulls down the movable arm in a closed state) in a schematic cross-sectional view without omitting the casing. FIG. 7A shows a protected device in a closed state, and FIG. 7B shows the state after changing from the state to the closed state. With this protection device, as shown in FIG. 7A, a bimetallic member 16 and a movable arm above the fixed terminal 14 (12) is located, and the bimetallic member 16 is located below the movable arm 12. The movable arm has an engagement portion 70 behind the contact point 32, and the front-end portion 36 of the bimetallic member 16 can engage the engagement portion 70. For example, the engagement portion 70 may be a hook-shaped portion in which the end portion is caught. More specifically, in the illustrated embodiment, the engagement portion 70 has a cross-sectional L-shaped shape.

As shown in FIG. 7A, the front end 36 of the bimetallic member 16 forcibly forces the movable arm 12 whose original shape is as shown in FIG. 7B in a state where it is engaged with the engagement portion 70 is held in the shape shown. That is, the bimetallic member 16 has a rigidity that does not substantially deform against the elastic force that the movable arm 16 tries to return to the original shape, and as a result, the bimetallic member 16 applies a force that lowers the front end 34 of the movable arm 12, that is, a pulling force. Thereby, in the illustrated embodiment, the contact 32 located at the front end 34 of the movable arm 12 is pressed against the contact 30 of the fixed terminal 14 and held in contact.

In the protection device of FIG. 7A, when the temperature of the bimetallic member 16 exceeds the threshold value, as in FIG. 7B. As shown above, the bimetallic member 16 is inverted, and the engagement relationship between the engagement portion 70 and the front-end portion 36 of the bimetallic member is dissolved. As a result, the lowering force applied by the bimetallic member 16 no longer works, the movable arm 12 will return to its original shape, and the front end 34 will be in the illustrated embodiment, and the contact 32 provided therein will be separated from the fixed terminal 14. In the illustrated embodiment, the contact 30 provided therein, and the protection device will be in an open state.

For ease of understanding, the bimetallic member is located below the movable arm except for matters related to the bimetallic member pulling down the movable arm, the first preferred aspect of the exemplary protection device described above (the embodiment in which the bimetallic member pushes down the movable arm in a closed state).

Figure 8:
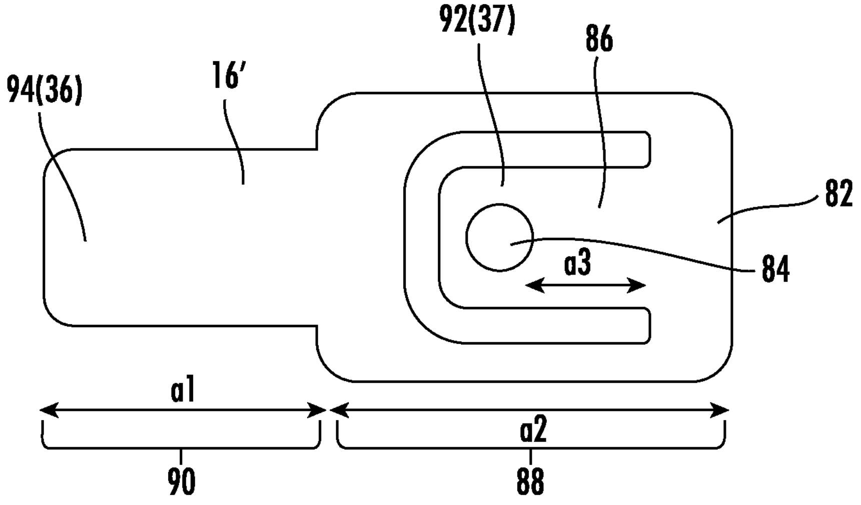
FIG. 8 is a diagram illustrating another view of the protection device of FIG. 1, in accordance with exemplary embodiments.

FIG. 8 shows another preferred embodiment of a bimetallic member for the exemplary protection device in its schematic plan view. The bimetallic member 16' is composed of portions 88 and 90 and has a flat plate-like shape of substantially square, substantially rectangular, substantially long, similar to the bimetallic member 16 described above.

The bimetallic member 16' shown in FIG. 8 has a penetrating opening 80 in the form of a substantially "U" shape (or "U" character) on the right-side portion 88, and the tongue-shaped portion 86 is forward from the right end base 82 of the right-side portion 88 (facing left on the figure), such that it stands out. In the illustrated embodiment, the tongue-shaped portion 86 has a penetrating opening 84 in close proximity to its end 92. In a state where the arm member to be fastened to the bimetallic member and the through opening provided in the extension member 27 of the second connection terminal and the through opening 84 are aligned.

By caulking, the bimetallic member, the movable arm, and the extension member can be connected integrally. Therefore, the end portion 92 corresponds to the rear end 37 of the bimetallic member 16 as if it were a part.

The bimetallic member 16' shown may have contacts on the underside of the front end 94 of the left portion 90 (corresponding to the front end 36 of the bimetallic member 16), which applies force to the movable arm. In the case of such a bimetallic member 16', a beam having a length of length a1 of the portion 90 and a length a2 of the portion 88 plus the length a3 of the tongue-shaped portion 86 can be considered to be caulked at the opening 84 acting as a fulcrum. That is, the bimetallic member shown in FIG. 8 is also a type of cantilever beam.

When the bimetallic member 16' is inverted, the front-end portion 94 moves upward and the front end of the movable arm moves upwards, forming a void between the fixed terminals and entering an open state. When a bimetallic member 16' like this is used, the length a3 of the tongue-shaped portion 86 can be additionally included as the length of the beam. Therefore, even though the total length of the bimetallic member is a1+a2, the length a3 of the tongue-like portion can also enter the length of the beam of the bimetallic member. That is, the bimetallic member of the structure of FIG. 8 can contribute to its compactness. Specifically, for example, a bimetallic member used in a small circuit breaker (PBA type) of Otter can be used as a bimetallic member.

INDUSTRIAL APPLICABILITY

As can be understood from the above description, the protection device of the present invention has a novel mechanism for separating the end of the movable arm from the fixed terminal in order to transition from the closed state to the open state and can be used for the protection of electrical devices, electrical circuits, and the like.

Element names and reference numbers used in the figures: 10: Protection device; 12: Movable arm; 13: Rear end of movable arm; 14: Fixed terminal; 16 and 16': Bimetallic members; 18: Casing; 20: Aperture; 22: End molded part; 24: 1st connection terminal; 26: 2nd connection terminal; 27 :Extension member; 28: Preassemble; 30: Fixed terminal contacts; 32: Movable arm contacts; 34: Movable arm front end; 36: Front end of bimetallic member; 37:Rear end of bimetallic member; 38: Front end of movable arm; 40:

Through opening; 42: Frontmost end of bimetallic member; 44: Stopper; 50: Pinching tab; 52: Weakened part; 56: Cutout; 58: Weakened part (V-shaped notch); 60: Protrusion; 70: Engagement; 80: Through-opening; 82: Base; 84: Through-opening; 86: Tongue-shaped part; 88: Right side part; 90: Left part; 92: Posterior end; 94: Anterior end As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure is not limited to the described embodiments, but that it has the full scope defined by the language of the following claims, and equivalents thereof.

The invention claimed is:

1. A protection device comprising:

a fixed terminal;

a movable arm comprising a movable arm end;

a bimetallic member located either above or below the movable arm, the bimetallic member comprising a bimetallic member end; and a casing to accommodate the fixed terminal, the movable arm, and the bimetallic member; wherein the bimetallic member end applies a force to the movable arm end, thereby holding the movable arm end in contact with the fixed terminal;

the bimetallic member further comprising a weakened portion adapted to cause the bimetallic member to fail in an open state after a predetermined number of state changes, whereby the bimetallic member can no longer hold the movable arm end in contact with the fixed terminal.

2. The protection device of claim 1, wherein the movable arm end resists an elastic force that seeks to move away from the fixed terminal, so that the movable arm end and the fixed terminal are held in contact.

3. The protection device of claim 2, wherein the movable arm end, when inverted, allows the movable arm to be transferred upwards, thereby separating the movable arm end from the fixed terminal.

4. The protection device of claim 1, wherein the bimetallic member is located above the movable arm.

5. The protection device of claim 4, wherein the bimetallic member end applies a pressing pressure to the movable arm end.

6. The protection device of claim 1, wherein the bimetallic member is located below the movable arm.

7. The protection device of claim 1, wherein a pulling force is applied to the movable arm end.

8. The protection device of claim 1, wherein the movable arm and the bimetallic member form a cantilever bond.

9. The protection device of claim 1, wherein the weakened portion is in the form of a notch.

10. The protection device of claim 1, the movable arm further comprising a contact at the movable arm end, wherein the contact is pressed toward the fixed terminal.

11. The protection device of claims 1, wherein the fixed terminal has a contact that comes into contact with the movable arm end.

12. The protection device of claim 1, wherein the bimetallic member has a flat plate shape or a downward concave plate shape before inversion.

13. The protection device of claim 1, further comprising a stopper that limits excessive movement of the bimetallic member in a downward direction.

* * * * *